United States Patent
Espino

(10) Patent No.: US 8,307,378 B2
(45) Date of Patent: *Nov. 6, 2012

(54) METHOD, SYSTEM AND COMPUTER PROGRAM PRODUCT FOR A LIGHTWEIGHT DIRECTORY ACCESS PROTOCOL CLIENT APPLICATION PROGRAM INTERFACE

(75) Inventor: Mayel Espino, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,336

(22) Filed: Aug. 8, 2011

(65) Prior Publication Data

US 2011/0296443 A1 Dec. 1, 2011

Related U.S. Application Data

(63) Continuation of application No. 11/764,480, filed on Jun. 18, 2007, now Pat. No. 8,015,574, which is a continuation of application No. 10/115,255, filed on Apr. 4, 2002, now Pat. No. 7,243,355.

(51) Int. Cl.
*G06F 13/00* (2006.01)

(52) U.S. Cl. .............. 719/328; 709/230; 707/999.003
(58) Field of Classification Search .............. 719/328; 709/230; 707/999.003
See application file for complete search history.

(56) References Cited

U.S. PATENT DOCUMENTS

| | | | |
|---|---|---|---|
| 6,842,903 B1 * | 1/2005 | Weschler | 719/328 |
| 6,976,262 B1 * | 12/2005 | Davis et al. | 719/328 |
| 7,272,836 B1 * | 9/2007 | Taylor | 719/328 |
| 7,299,257 B2 * | 11/2007 | Boyer et al. | 709/204 |
| 2002/0046301 A1 * | 4/2002 | Shannon et al. | 709/328 |
| 2002/0169842 A1 * | 11/2002 | Christensen et al. | 709/206 |

* cited by examiner

*Primary Examiner* — Andy Ho

(57) ABSTRACT

A device, including a computer readable medium storing executable computer instructions for implementing an application program interface (API). The API including a function call for enabling communications between a calling application and a client on the device, the client communicating with a directory server. In another aspect, there is provided a computer-readable medium, including executable computer instructions for implementing an application program interface (API) on a device. The API, including a function call for enabling communications between a calling application and a client on the device, the client communicating with a directory server.

20 Claims, 8 Drawing Sheets

| Function | Description |
|---|---|
| LDAPc.Subscribe(char* application, char* query, char* buffer) | (i) Registers a current application with a LDAPc, makes the LDAP client eligible to receive an update event when another application requests an update, if a user flagged such application to be automatically updated. To flag an application for automatic update the user goes to a LDAP client customization screen.<br><br>(ii) Establishes a context for an application to make a query at the user's request. |
| LDAPc.QueryNow() | Signals the LDAP client to go issue a query for a current and every application flagged for automatic update. The current application may or may not be flagged for automatic update. |
| LDAPc.GetNextRow() | Gets a next row of information from a LDAP query result. |
| LDAPc.Done() | Releases resources. |
| LDAPc.UpdateSignal() | Checks to see if another application requested an update, and if a current application is earmarked for automatic update by a user. |

*Figure 6b*

| Function | Description |
|---|---|
| LDAPc.SetPref(ldapcpref* pldappref) | Sets preferences for LDAP application that relate to the LDAP client. |
| LDAPc.GetPref(ldapcpref* pldappref) | Gets preferences for LDAP application that relate to the LDAP client. |
| LDAPc.LastUpdate(timeNdate* pTimeNDate) | Gets the time and date since the current LDAP application has been updated by the LDAP client. |

*Figure 6c*

METHOD, SYSTEM AND COMPUTER PROGRAM PRODUCT FOR A LIGHTWEIGHT DIRECTORY ACCESS PROTOCOL CLIENT APPLICATION PROGRAM INTERFACE

CROSS REFERENCE TO RELATED CASES

The present application is a continuation of U.S. patent application Ser. No. 11/764,480, filed Jun. 18, 2007, now U.S. Pat. No. 8,015,574, which is a continuation of U.S. patent application Ser. No. 10/115,255, filed Apr. 4, 2002, now U.S. Pat. No. 7,243,355; and is related to the following commonly owned United States Patent Applications of Espino filed herewith entitled: (1) "LIGHTWEIGHT DIRECTORY ACCESS PROTOCOL METHOD, SYSTEM AND COMPUTER PROGRAM PRODUCT," Ser. No. 10/115,254, (2) "LIGHTWEIGHT DIRECTORY ACCESS PROTOCOL CLIENT," Ser. No. 10/114,939, (3) "METHOD, DEVICE AND COMPUTER PROGRAM PRODUCT INCLUDING A LIGHTWEIGHT DIRECTORY ACCESS PROTOCOL CLIENT ARCHITECTURE," Ser. No. 10/115,251, and (4) "METHOD, SYSTEM AND COMPUTER PROGRAM PRODUCT FOR LIGHTWEIGHT DIRECTORY ACCESS PROTOCOL APPLICATIONS," Ser. No. 10/115,258, the entire contents of all of which are incorporated herein by reference.

BACKGROUND OF THE INVENTION

1. Field of the Invention

The present invention relates to the lightweight directory access protocol and more particularly to a method, system and computer program product including a lightweight directory access protocol client application program interface.

2. Discussion of the Background

In recent years, hand-held devices, such as personal digital assistants (PDAs), palmtop computers, cell phones, etc., have gained widespread use for performing non-standard functions, such as e-mail functions, Web browser functions, stock quote functions, weather reporting functions, news reporting functions, graphical display functions, audio and video streaming functions, etc. In such hand-held devices, however, memory and processing power are at a premium due the small size of such devices. Nonetheless, such devices typically use HTML/HTTP for performing such functions, even though HTML/HTTP may not be very well suited for such applications in view of the memory and processing power constraints of such devices.

For example, in implementing a web browser function, numerous instructions are typically used to render a single HTML document, which consumes precious memory and processor resources. In addition, a web browser function typically uses cache to store the HTML source code and any included images, further consuming memory and processor resources. Part of the problem stems from the fact that most Web pages include numerous graphics and are designed for viewing on personal and laptop computers, which typically have sufficient memory and processor resources, as compared to hand-held devices. Even if a text-only browser may be employed, it may be still difficult to navigate most Web pages because of their inherent graphical design.

Therefore, there is a need for a system and device that provides non-standard functions, such as e-mail functions, Web browser functions, stock quote functions, weather reporting functions, news reporting functions, graphical display functions, audio and video streaming functions, etc., but consumes less memory and processor resources than conventional systems and devices.

SUMMARY OF THE INVENTION

The above and other needs are addressed by the present invention, which provides an improved method, device and computer program product for a lightweight directory access protocol (LDAP) client application program interface (API). The API may be used for writing one or more LDAP-based applications used in a device including a LDAP client.

Accordingly, in one aspect of the present invention there is provided a device, including a computer readable medium storing executable computer instructions for implementing an application program interface (API). The API including a function call for enabling communications between a calling application and a client on the device, the client communicating with a directory server.

In another aspect of the present invention there is provided a computer-readable medium, including executable computer instructions for implementing an application program interface (API) on a device. The API, including a function call for enabling communications between a calling application and a client on the device, the client communicating with a directory server.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details may be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6*b*-6*c* are a diagram illustrating exemplary functions calls of the API of FIG. 6*a*.

DETAILED DESCRIPTION OF THE PREFERRED EMBODIMENTS

Figure 1:
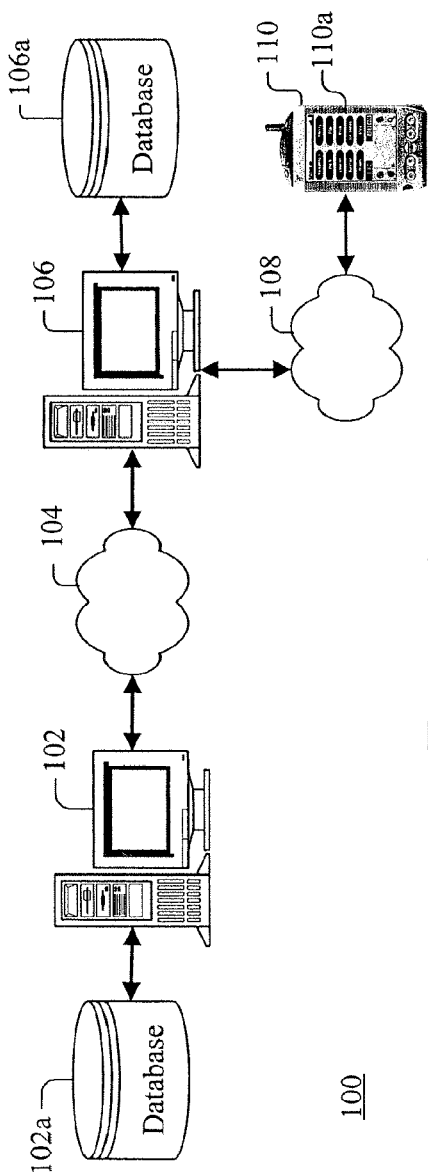
FIG. 1 is a block diagram illustrating a lightweight directory access protocol (LDAP) system.

A method, device and computer program product for a lightweight directory access protocol (LDAP) client application program interface (API), are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

The present invention includes numerous advantages over conventional HTML/HTTP-based systems and methods typically used in hand-held devices. In this respect, the present invention includes recognition that HTML/HTTP may be bloated when compared to lightweight directory access protocol (LDAP, e,g., as taught in "Implementing LDAP," by Mark Wilcox, March 1999, the entire contents of which are incorporated herein by reference). Accordingly, a HTML/HTTP Web browser function typically needs more instructions to render an HTML document than a thin LDAP client according to the present invention uses to process and reply to a query and perform a similar function.

In addition, a Web browser function using HTML/HTTP would typically need cache to store the HTML and perhaps images, whereas a thin LDAP client according to the present invention typically employs only the space needed to store query results and the space to store the query results may be configured. Further, for the types of services and applications that the present invention suggests (e.g., as described in commonly owned co-pending U.S. patent application filed herewith, entitled "METHOD, SYSTEM AND COMPUTER PROGRAM PRODUCT FOR LIGHTWEIGHT DIRECTORY ACCESS PROTOCOL APPLICATIONS," Ser. No. 10/115,258), there may be typically no need for intensive graphics or an exuberant layout. Moreover, LDAP results in less network traffic than HTML/HTTP because in HTML/HTTP each request constitutes anew session or connection, whereas with LDAP functions that would employ multiple HTML/HTTP requests may be accomplished via a single LDAP query.

In the above respect, a thin LDAP client may be ideally suited for hand-held devices because such implementation addresses the previously noted problems with conventional HTTP/HTML-based hand-held devices. In this respect, LDAP may retrieve information with less network overhead than HTTP/HTML. The LDAP client maximizes the amount of information retrieved in a transaction by using a single query, rather than multiple queries. The LDAP client may be a small program compared to conventional HTTP/HTML-based clients. The less space taken up by the LDAP client program the more space that may be available for storing information and other applications. The LDAP client typically does not need to store and process HTML tags. A directory service or back end server for servicing a device including the LDAP client may be based on a subscription service paid monthly, a service included as part of an Internet subscription, etc.

The following exemplary scenarios illustrate a typical LDAP client-based transaction versus a typical HTTP/HTML client-based transaction. In an LDAP client-based transaction: (i) the LDAP client establishes a connection to a back end server (e.g., including a LDAP directory server, etc.), (ii) the LDAP client makes a single LDAP request, (iii) the back end server sends all the information that the LDAP client may handle in a single transmission, (iv) the LDAP client processes predefined attributes stored as part of an application or program, and (v) the application presents the information to a user of the LDAP client-based device.

Because the LDAP may include a query language, the LDAP client may create a LDAP query string based on the applications that are installed on the LDAP client-based device. Via the query string, the applications may have their information updated (e.g., updated sports scores for a sports-related application, updated stock quotes for a stock quote-related application, updated e-mail messages for an e-mail-related application, updated addresses for a contact management-related application, etc.).

The query string may be a text in the LDAP language that may be transmitted from the LDAP, client-based device (e.g., via a modem device, etc.) to the back end server. The back end server may return a query result based on the query string received from the LDAP client-based device. Thus, advantageously, with a single LDAP query from the LDAP client-based device (as opposed to multiple transactions with the HTML-based device), the back end server may be informed of what information may be requested for update by the applications of the LDAP client-based device.

In contrast, in a HTTP/HTML client-based transaction: (i) the HTTP/HTML client establishes a connection to a Web server, (ii) the HTTP/HTML client makes a HTML request, (iii) the Web server sends a HTML main page, (iv) the HTTP/HTML client retrieves additional HTML elements, such as images, etc., one transmission per item, (v) the HTTP/HTML client processes tags stored in memory and (vi) the HTTP/HTML client presents the information to a user the HTTP/HTML-based device. As shown by the above exemplary scenarios the LDAP client-based transaction may be more efficient, uses less memory and processor resources and maximizes use of a network and bandwidth, as compared to the conventional HTTP/HTML client-based transaction.

Accordingly, the LDAP client pulls the information for an associated application in a single query, minimizing transaction time. An HTTP/HTML client, on the other hand, generates multiple requests to load all of the elements of an HTML page. The LDAP client loads information received from the back end server into a database. When the user selects an application, the application uses the information in the database directly, resulting in quick and efficient application processing. An HTTP/HTML client, on the other hand, may be more resource intensive because it includes software that process the tags, applets, scripts, and other HTML components included in the HTML page(s) sent in response to the HTTP/HTML request.

Referring now to the drawings, wherein like reference numerals designate identical or corresponding parts throughout the several views, and more particularly to FIG. 1 thereof, there is illustrated a block diagram of a LDAP system 100, according to the present invention. In FIG. 1, the system 100 includes content server 102 and corresponding database 102a, back end server 106 and corresponding database 106a and a device 110, such as a hand-held device, a personal digital assistant (PDA), a cellular phone, an Internet appliance, a palmtop computer, etc. The content server 102 may be coupled to the back end server 106 via communications network 104. The back end server 106 may be coupled to the device 110 via communications network 108. The device 110 includes a LDAP client and a display screen 110a for displaying and running one or more applications.

Figure 3:
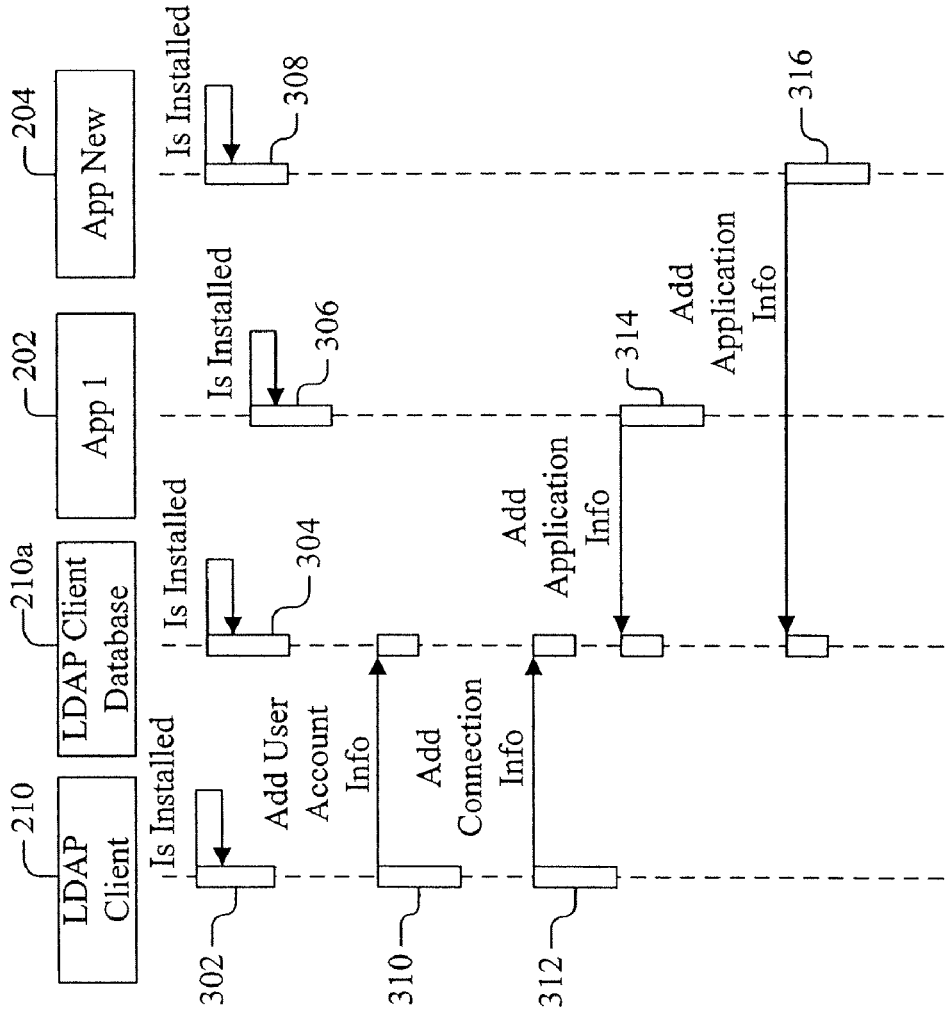
FIG. 3 is a sequence diagram illustrating an exemplary installation scenario for applications on the device of the system of FIG. 1.
Figure 4:
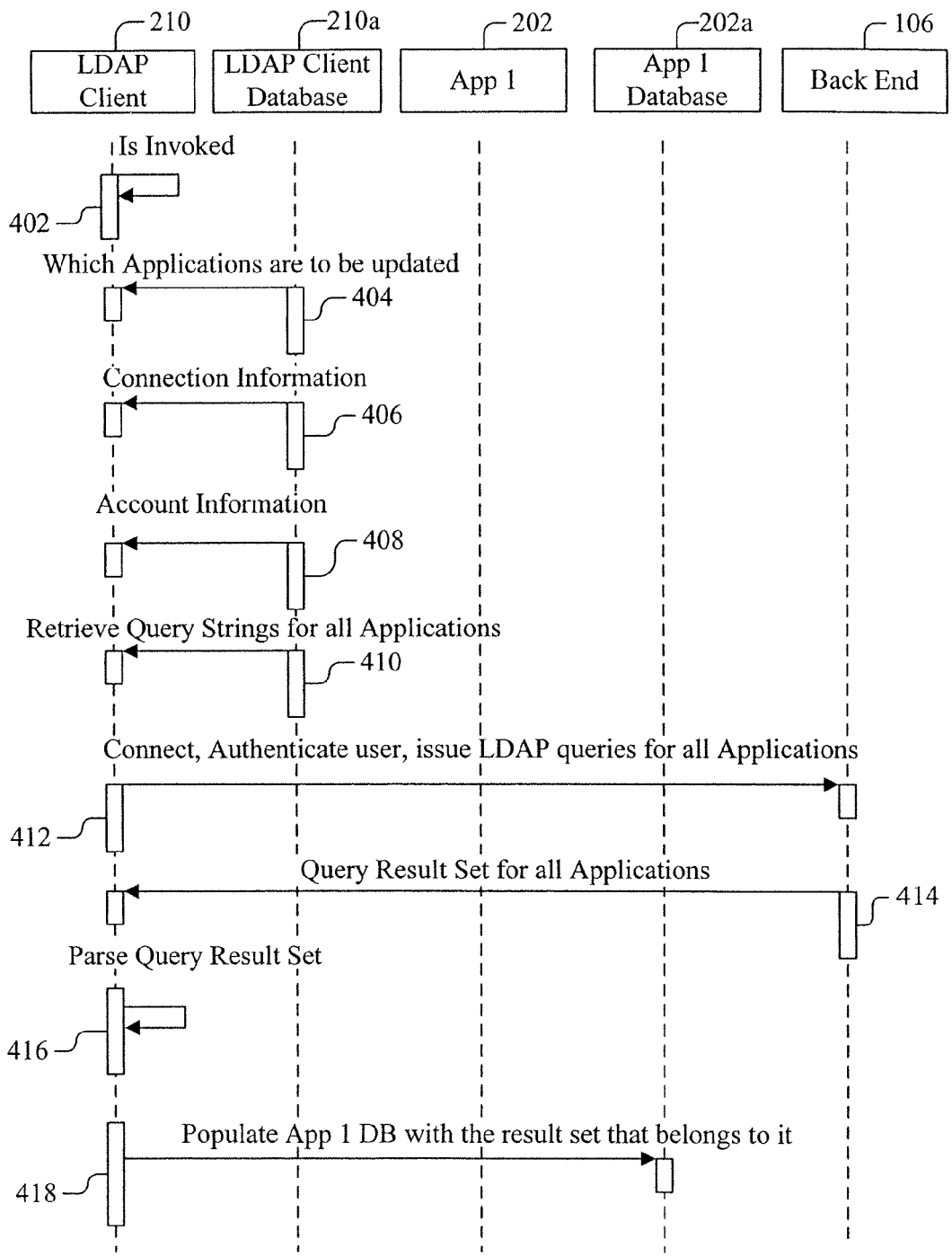
FIG. 4 is a sequence diagram illustrating an exemplary first use scenario of an application of the device of the system of FIG. 1.
Figure 5:
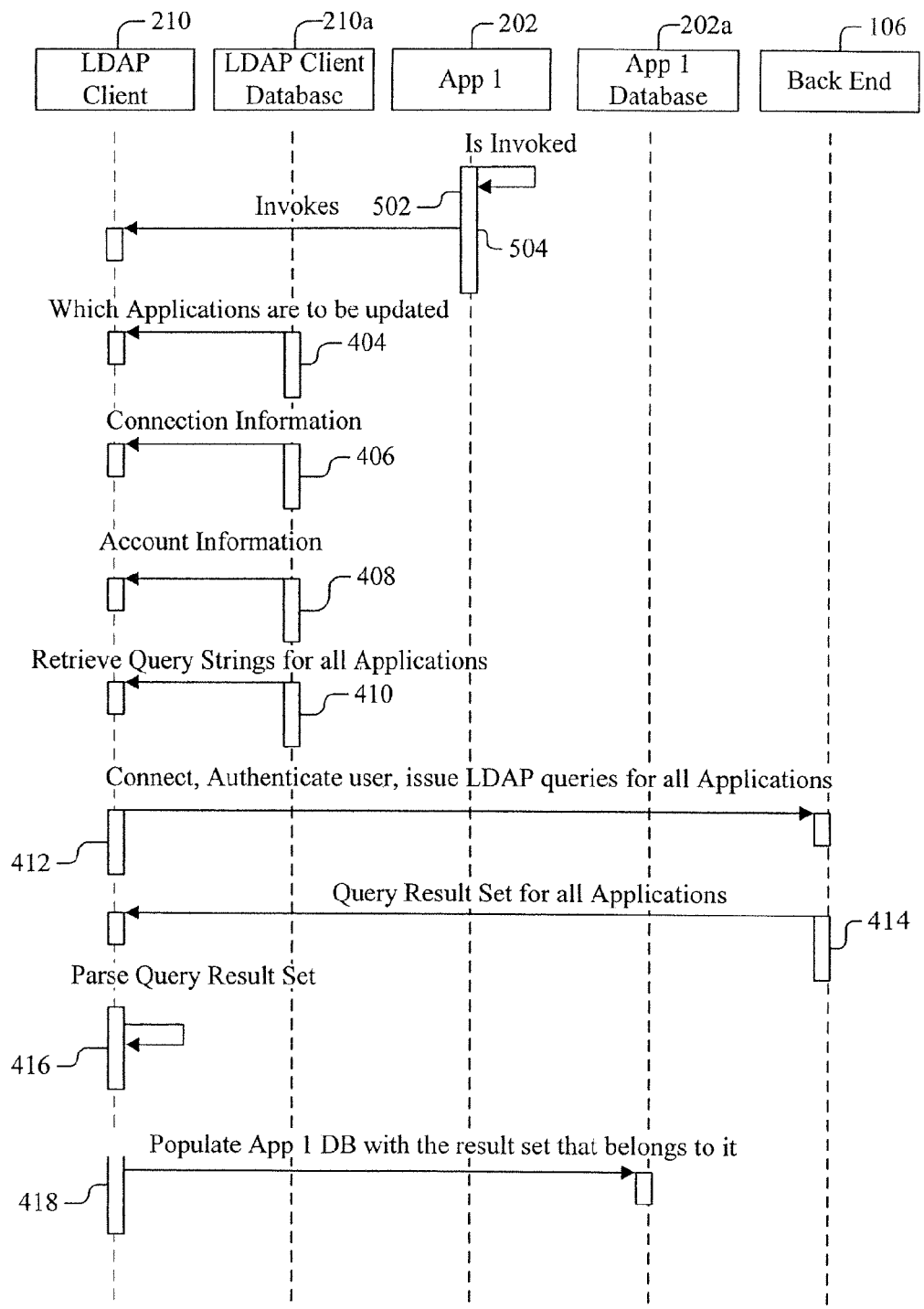
FIG. 5 is a sequence diagram illustrating an exemplary second use scenario of an application of the device of the system of FIG. 1.

In FIG. 1, the device 110 communicates with the back end server 106 using LDAP over, for example, TCP/IP via the communications network 108 to install and use applications, for example, as described with respect to FIGS. 3-5. The content server 102 and the corresponding database 102*a* may include any content source, such a Web Site, an electronic bulletin board, a digital library, a streaming or download video server, a streaming or download music server, etc.

The device 110 may include a digital networking or modem networking function (e.g., dial-up, DSL, cable, wireless, etc.) that may dial in to an assigned phone number list or log in to the back end server 106 with user validation (e,g., via a personal identification number (PIN), user name and password, etc.). Once a connection to the back end server 106 may be established, the LDAP protocol may be used between back end server 106 and a LDAP client of the device 110. If the modem or network may be in use and there is a TCP/IP connection available, the device 110 may use the TCP/IP connection to contact the back end server 106. The device 110 and may be implemented using the computer system 703 of FIG. 7, for example.

The LDAP client of the device 110 is further described in the commonly owned co-pending U.S. patent application filed herewith, entitled "METHOD, DEVICE AND COMPUTER PROGRAM PRODUCT INCLUDING A LIGHT-WEIGHT DIRECTORY ACCESS PROTOCOL CLIENT," Ser. No. 10/114,939. The device 110 may be implemented using the computer system 701 of FIG. 7, for example.

The back end server 106 communicates with the content server 102 using any suitable protocol, for example, TCP/IP via the communications network 104. The back end server 106 transfers the content from the content server 102, which then may be stored in the database 106*a*. The back end server 106 serves the content to the applications of the device 110 via the communications network 108. The back end server 106 includes all software and hardware, for example, to provide user account maintenance, to process validation and access control level (ACL) information, to provide a LDAP directory server where content and other information may be kept, etc.

The LDAP directory server that may be included in the back end server 106 may include an LDAP directory implemented via the database 106*a*. Generally, the LDAP directory may be a specialized database read from or searched far more often than written to, may include a flexible mechanism for keeping up with ongoing changes in the types of information stored therein, may be highly distributed on a large scale, may be replicated (e.g., by hundreds or thousands of replicas) to provide high availability to the devices 110 accessing them, etc.

The user account maintenance and validation and ACL functionality performed by the back end server 106 may include: (i) storing account information for a new user on the database 106*a*; (ii) allowing a user to select the information that the user may want to subscribe to (e.g., sports scores, stock quotes, e-mail messaging, address look-up information, etc.); (iii) allowing a user to change their password; (iv) allowing an administrator of the back end server 106 to determine a level of access that a particular user has; (v) adding, deleting and modifying user information. Such tasks may be accomplished, for example, via a combination of off-the-shelf commercial software products and hardware devices and/or custom developed software products and hardware devices. For example, a web-based interface may be provided by the back end server 106 for the users to at their leisure add, remove modify subscribed services, change their password, etc.

Configurations of the system 100 and the back end server 106 are further described in the commonly owned co-pending U.S. patent application filed herewith, entitled "LIGHT-WEIGHT DIRECTORY ACCESS PROTOCOL METHOD, SYSTEM AND COMPUTER PROGRAM PRODUCT," Ser. No. 10/115,254 and may be implemented using the computer system 701 of FIG. 7, for example.

It is to be understood that the system in FIG. 1 is for exemplary purposes only, as many variations of the specific hardware used to implement the present invention are possible, as will be appreciated by those skilled in the relevant art(s). For example, the functionality of the one or more of the systems 102-110 may be implemented via one or more programmed computers or devices. To implement such variations as well as other variations, a single computer (e.g., the computer system 701 of FIG. 7) may be programmed to perform the special purpose functions of, for example, the systems 102, 106 and/or 108 shown in FIG. 1. On the other hand, two or more programmed computers or devices, for example as in shown FIG. 7, may be substituted for any one of the systems 102-110. Principles and advantages of distributed processing, such as redundancy, replication, etc., may also be implemented as desired to increase the robustness and performance of the system 100, for example.

Accordingly, the systems 102-110 are any suitable servers, workstations, personal computers (PCs), PDAs, Internet appliances, cellular phones, palmtop computers, other devices, etc., capable of performing the processes of the present invention. The systems 102 and 106 may communicate with each other using any suitable protocol over communications network 104. The systems 106 and 110 may communicate with each other using the LDAP protocol over communications network 108. The systems 102-110 may be implemented using the computer system 701 of FIG. 7, for example.

The communications networks 104 and 108 may be implemented via one or more communications networks (e.g., the Internet, an Intranet, a wireless communications network, a satellite communications network, a cellular communications network, a hybrid network, etc.), as will be appreciated by those skilled in the relevant art(s). In a preferred embodiment of the present invention, the communications networks 104 and 108 preferably use electrical, electromagnetic, optical signals, etc., that carry digital data streams, as are further described with respect to FIG. 7.

Figure 2:
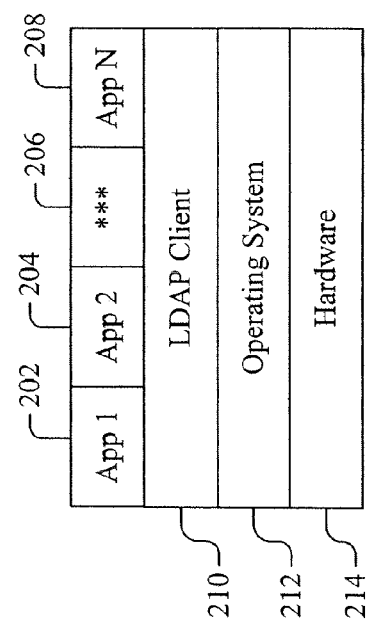
FIG. 2 is a block diagram illustrating a logical architecture of a LDAP device of the system of FIG. 1.

FIG. 2 is a block diagram illustrating a logical architecture of the LDAP device 110 of the system of FIG. 1, including a LDAP client 210, according to the present invention. In FIG. 2, the LDAP client 210 communicates with applications 202-208 and an operating system (OS) 212 of the device 110. The OS 212 communicates with hardware 214, which in turn communicates with the back end server 106 via the network 108. Accordingly, the LDAP client 210 may be able to gather or update information used by the applications 202-208 and service the applications 202-208 with the help of the OS 212 and the hardware 214. The LDAP client 210 serves as an intermediary between the applications 202-208 and the OS 212 and the hardware 214, and may be a conduit through which data may be transferred.

Thus, the LDAP client 210 may function as go between or intermediary between the applications 202-208 and the OS 212 and/or the hardware 214. The LDAP client 210 may handle communications with the OS 212 and the hardware 214, allowing programmers of the applications 202-208 to concentrate on the processing and presenting of data and interactions with the user of device 110.

Accordingly, the LDAP client 210 may service a plurality of processes corresponding to the applications 202-208 executing on the device 110. Each process may include a unit of activity characterized by a sequential thread of execution, a current state, and an associated set of device 110 resources.

Generally, each process may occupy its own address space in a memory implemented in the hardware 214 of the device 110.

The arrangement of FIG. 2 also may be more efficient than an arrangement including multiple LDAP clients servicing respective applications. This is because by employing a single LDAP client 210, instead of employing multiple LDAP clients each performing the functions performed by the single LDAP client 210, code and duplication of tasks may be reduced.

Possible LDAP client architectures are further described in the commonly owned co-pending U.S. patent application filed herewith, entitled "METHOD, DEVICE AND COMPUTER PROGRAM PRODUCT INCLUDING A LIGHTWEIGHT DIRECTORY ACCESS PROTOCOL CLIENT," Ser. No. 10/114,939.

The LDAP client 210 may interact with the back end server 106 via the hardware 214 and the network 108. The LDAP client 210 may be a software entity that, for example: (i) establishes a connection to the back end server 106 via the hardware 214; (ii) transmits a user identification (ID, e.g., a user name, password, etc.) to the back end server 106 for validation; (iii) recognizes all applications 202-208 that are present in the device 110; (iv) recognizes which of the applications 202-208 have information to be updated or refreshed; (v) issues LDAP queries on behalf of the applications 202-208; (vi) retrieves and parses a query result set received from the back end server 106 in response to an LDAP query from the device 110; (vii) populates appropriate databases implemented in a memory of the device 110 corresponding to the applications 202-208 with information received via the parsed query result set; (viii) services all present and future applications via, for example, a single instance of the LDAP client 210; and (ix) centralizes parameters of the user of the device 110 and customization parameters for the applications 202-208 and/or the device 110.

To illustrate the above-noted processes, the user of the device 110 may invoke or run one of the applications 202-208, for example, a movie listings application, etc. This may be one of many applications installed along with the LDAP client 210 on the device 110. The LDAP client 210 may include configuration parameters, such as a parameters indicating which applications are installed in the device 110, a parameters indicating which applications may have information (e.g., movie listings information, etc.) to updated in a database of the LDAP client 210 associated with the applications upon a next call or interaction with the back end server 106, etc.

The back end server 106 may include directory servers, firewalls, modem banks, etc. The back end server 106 also may include hardware and/or software for receiving a call from the device 110, for establishing a TCP/IP and LDAP connection with the device 110, for handling validation of the user of the device 110, for storing and transmitting information to the device 110, etc.

Each application 202-208 may include a GUI, which may include an update or refresh button, which may invoke the LDAP client 210 and may initiate updating of information (e.g., movie listings, etc.) for an application as well as any other applications that may be configured to be automatically updated whenever any application gets updated. Optionally, an icon may be provided in a main menu of the display 110a of the device 110 to provide such update or refresh functionality.

The hardware 214 may include any hardware and/or device that may establish a connection with the back end server 106 via, for example, a modem, network card, wireless device, etc. The OS 212 may include any operating system that may operate the hardware 214 and enable the LDAP client 210 to establish the operation of the LDAP.

When a call comes in to, for example, modem banks of the back end server 106, the TCP/IP protocol then the LDAP may be established with the device 110 and information may be served by the back end server 106 to the device 110. The back end server 106 may be responsible for validating a user of the device 110 and ensuring that the user of the device 110 receives information that the user of the device 110 may be privileged to receive. The back end server also may be responsible for maintaining accounting and/or billing information of the user of the device 110.

The hardware 214 may include any hardware and/or device that may establish a connection with the back end server 106 via, for example, a modem, network card, wireless device, etc. The OS 212 may include any operating system (e.g., Windows CE, Palm OS, Linux, PocketPC, etc.) that may operate the hardware 214 and enable the LDAP client 210 to establish the operation of the LDAP.

The applications 202-208 may include, for example, any software applications as describe in the commonly owned co-pending U.S. patent application filed herewith, entitled "METHOD, SYSTEM AND COMPUTER PROGRAM PRODUCT FOR LIGHTWEIGHT DIRECTORY ACCESS PROTOCOL APPLICATIONS," Ser. No. 10/115,258, third party applications, open source applications, freeware applications, shareware applications, etc. The applications 202-208 may be responsible for interacting with a user of the device 110 and managing data related to the user and/or the device 110.

FIG. 3 is a sequence diagram illustrating an exemplary installation scenario for the applications 202-208 on the device 110 of the system of FIG. 1, according to the present invention. In FIG. 3, processing may begin at step 302, wherein the OS 212 via the hardware 214 may install the LDAP client 210.

The installation of the LDAP client 210 and/or the applications 202-208 on the device 110, may be performed by a combination of software and hardware. For example, a desktop application running on a PC of the user of the device 110 may be provided and which may include various PC applications, such a calendar with appointments application, a phone book application, etc.

The information from the desktop application may be synchronized with the corresponding information in the device 110 via a hardware device, such as a cradle, etc., that the device 110 sits in and that is connected to the PC (e.g., via a cable to an RS232 port, communications port, USB port, etc.) of the user of the device 110. The OS 212 via the hardware 214 of the device 110 may then communicate with the PC of the user of the device 110 via the cradle, etc. Accordingly, a record may be updated or deleted on the device 110 and a next time synchronization occurs, the information from the device 110 may be updated in the corresponding desktop application on the PC and visa versa.

The desktop application also may include an installation dialog, whereby application files (e.g., downloaded over the Internet, etc.), such as the applications 202-208, etc., for the device 110 stored on a hard drive of the PC may be selected to be downloaded and/or installed on to the device 110. Such application files may include programs and/or databases that may be in a format that may be proprietary to the device 110. At a next synchronization, such application files may be downloaded and/or installed on the device 110.

At step 304, a database 210a including configuration parameters for the LDAP client 210 may be installed or created in the hardware 214 by, for example, the OS 212. At steps 306 and 308, the LDAP client 210 may install the applications 202 and 204. At step 310, the LDAP client 210 may add user account-related information to the database 210a. At step 312, the LDAP client 210 may add connection-related information to the database 210a. At step 314, the application 202 may add application-related information to the database 210a. At step 316, the application 204 may add application-related information to the database 210a, completing the exemplary installation scenario. Accordingly, via the above processes, the LDAP client 210 may be installed and in turn may install one or more of the applications 202-208 and store information for the applications 202-208 in the databases 210.

The user account-related information may include information about the user of the device 110 that may allow the back end server 106 to determine if the user of the device 110 has access to the back end server 106, what level of access the user of the device 110 may have, etc., for billing and other purposes. The connection-related information may include information that allows the LDAP client 210 to connect to the back end server 106 (e.g., a telephone number to dial, a TCP/IP address of a directory server of the back end server 106 to connect to, etc.). The application-related information may include information that the LDAP client 210 may need to know about each of the application 202-208 that may installed on the device 110, such as query strings for the applications 202-208, flags (e.g., set to true or false, etc.) that may indicate if the information related to the applications 202-208 may be returned by the back end server 106 to the LDAP client 210, etc.

FIG. 4 is a sequence diagram illustrating an exemplary first use scenario of the application 202 of the device 110 of the system of FIG. 1, according to the present invention. In FIG. 4, processing begins at step 402, wherein the OS 212 invokes the LDAP client 210. The LDAP client 210 may be invoked in a number of different ways. For example, a user of the device 110 may select one of the applications 202-208, which in turn invokes the LDAP client 210, the OS 212 may include a trigger, such as a timer, that invokes the LDAP client 210, the user of the device 110 may select the LDAP client 210 itself, etc.

The applications 202-208 also may be invoked by the user of the device 110 tapping on an icon for one of the applications 202-208 using, for example, a stylus (e.g., a device shaped like pen, etc.). Such tapping may be detected by the OS 212, which launches the corresponding application. The launched application may include a refresh button, which when tapped may launch the LDAP client 230. The timer also may be employed to allow events, such as invoking one of the applications 202-208, the LDAP client 210, etc., to occur periodically.

At step 404, applications to be updated, for example, the application 202, may be determined from the application-related information (e.g., flags, parameters, etc.) stored in the database 210a of the LDAP client 210. At step 406, the LDAP client 210 may gather the connection-related information (e.g., a telephone number to dial, a TCP/IP address of a directory server of the back end server 106 to connect to, etc.) for the application 202 from the database 210a. At step 408, the LDAP client 210 may gather the account-related information (e.g., user identification, access level, billing information, etc.) for the application 202 from the database 210a. At step 410, the LDAP client 210 may gather the query strings for all the applications 202-208 from the application-related information stored in the database 210a.

At step 412, the LDAP client 210, via the connection-related information for the applications 202-208 gathered from the database 210a, the hardware 214, and the communications network 108, may establish a connection with the back end server 106. The back-end server 106 may authenticate a user of the device 110 via the account related information for the applications 202-208 gathered from the database 210a. The LDAP client 210 may transmit the query strings for the applications 202-208, gathered from the application-related in the database 210a, to the back end server 106. The authentication in step 412 may occur at the back end server 106 in a variety ways. For example, the LDAP may include provisions for user authentication and/or at a time of establishing a TCP/IP protocol there may be employed other levels of or means for authentication.

At step 414, the back end server 106, via the communications network 108 and the hardware 214, may transmit a query result set for the applications 202-208 to the LDAP client 210. At step 416, the LDAP client 210 may parse the query result set. At step 418, the LDAP client 210 may populate a database 202a (e.g., created or installed in the hardware 214 by the LDAP client 210, etc.) corresponding to the application 202 with the result set belonging to the application 202, completing the exemplary first use scenario. Via the above processes, the LDAP client 210 may be invoked to run and update one or more of the applications 202-208.

In the above scenario, the back end server 106 may receive a call from the device 110 via, for example, a modem bank over the communications network 108. The back end server 106 may answer the call from the device 110. The device 110 and the back end server 106 may establish a TCP/IP connection over the communications network 108. The back end server 106 may authenticate the account-related information received from the device 110 over the communications network 108, for example, via software at the back end server 106.

A directory server implemented at the back end server 106 may receive the query strings for the applications 202-208 from the device 110 over the communications network 108. The back end server 106 may return the query result sets corresponding to the query strings received from the device 110 to the LDAP client 210 of the device 110 over the communications network 108.

Query result sets corresponding to the applications 202-208 may be returned by the back end server 106 to the LDAP client 210 in response to receiving the query strings the applications 202-208 in the LDAP format. A query result set received from the back end server 106 by the LDAP client 210, may be parsed by the LDAP client 210 using, for example, API function calls. The LDAP client 210 may know, via flags from the application-related information stored in the database 210 for the applications 202-208, which databases may be populated or which databases may have records thereof updated.

The back end server 106 may include custom software and mechanisms to obtain content from the content server 102. For example, with respect to providing a movie listings application, a format for delivery of movie listings information from the content server 102 to the back end server 106 may be determined and such information may be stored in the database 106a for use by directory servers of the back end server 106. The back end server 106 also may automatically gather information from the content server 102 using, for example, search engines, bots, parsing techniques, etc.

FIG. 5 is a sequence diagram illustrating an exemplary second use scenario of the application 202 of the device 110 of the system of FIG. 1, according to the present invention. In FIG. 5, processing may begin at step 502, wherein the application 202 may be invoked, as described previously, in turn invoking the LDAP client 210 at step 504. Steps 404-418 complete the exemplary installation scenario. Steps 404-418 may be performed in similar manner as described with respect to steps 404-418 of FIG. 4.

Accordingly, each of the application 202-208 may: (i) inform the LDAP client 210 that they may have been installed and provide LDAP client 210 with the application-related information, such as the query strings; (ii) present information (e.g., the parsed query results, etc.) received from the LDAP client 210 to the user of the device 110 in a GUI; (iii) interact with the user of the device 110; (iv) at the request of the user of the device 110, request that the LDAP client perform an information update (e.g., by the LDAP client 210 transmitting a query suing to the back end server 106, etc.); (v) indicate if the information contained in the database 210a of the LDAP client 210 may be expired or may be old; (vi) modify the application behavior according to preferences of the user of the device 110 stored in the database 210a of the LDAP client 210; and (vii) allow the user of the device 110 to set values for the preference parameters for the application.

On the other hand, the LDAP client 210 may: (i) establish connectivity with the back end server 106; (ii) validate the user of the device 110 via the back end server 106; (iii) gather the query strings for the applications 202-210 that may be flagged for update; (iv) send a query to the back end server 106; (v) receive the query result sets from the back end server 106; (vi) update the corresponding databases in the database 210a of the LDAP client 210 for the applications 202-208; and (vi) release resources by closing the connection with the back end server 106 and the databases for the applications 202-208.

The API of the present invention may assist the application 202-208 and the LDAP client 210 in performing the above-noted processes, via function calls that may be included as part of the API. Accordingly, the API of the present invention may include a series of function calls, which may perform specific tasks on behalf of the applications 202-208 and/or the LDAP client 210.

The function calls may implemented in a library, which may be provided and may be installed as part of the LDAP client 210 installation in the device 110. For example, a function call may store, in the database 210a of the LDAP client 210a, the query string for one of the applications 202-208 making the function call, may indicate whether or not the application making the function call may be updated, etc.

The API may be conceptualized in various ways. The API, like a protocol, may be intangible. However, the API may be conceptualized as a library that may reside in a memory included in the hardware 214 of the device 110. The device 110, typically, may not include a hard drive, but may include non-volatile memory, which may serve as both RAM and a hard drive combined. The LDAP client 210, thus, may include the API or library of function calls.

Figure 6A:
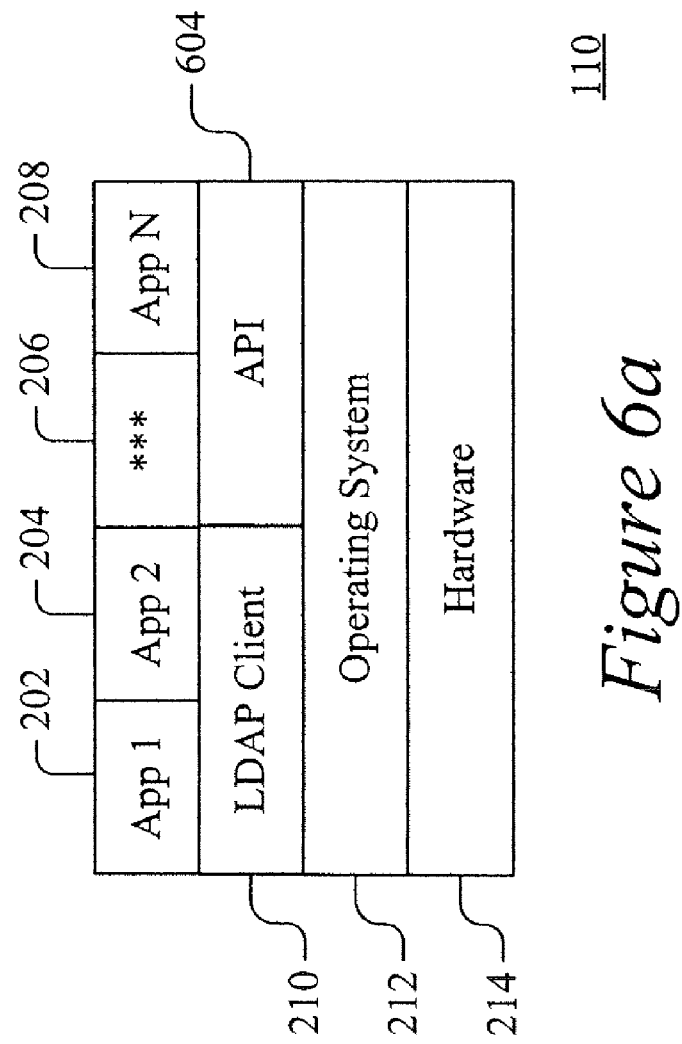
FIG. 6*a* is a block diagram illustrating a logical architecture of a LDAP device of the system of FIG. 1 including a LDAP client application program interface (API)

Referring to FIG. 2 and considering the library conceptualization of the API, the API may be considered a part of the LDAP client 210 or as a separate entity. Both conceptualizations may be valid. Accordingly, FIG. 6a is a block diagram illustrating a logical architecture of the LDAP device 110 of the system of FIG. 1, including a LDAP client application API 604. In FIG. 6a, the components 202-214 may function in a similar manner as described with respect to FIG. 2.

FIGS. 6b-6c are block diagrams describing exemplary LDAP client 200 API 604 function calls 602a-602h, according to the present invention. The API 604 may be used to implement one or more of the applications 202-208 shown in FIG. 2 and applications, for example, as further described in the commonly owned co-pending U.S. patent application filed herewith, entitled "METHOD, SYSTEM AND COMPUTER PROGRAM PRODUCT FOR LIGHTWEIGHT DIRECTORY ACCESS PROTOCOL APPLICATIONS," Ser. No. 10/115,258. The API 604 function calls 602a-602h may interact with the LDAP client 210 and/or the applications 202-208 of FIG. 6a. The API 604 function calls may be published to a developer community, so that new applications using the API 604 may be developed for the device 110.

In FIGS. 6b and 6c, the API 604 may include, for example, one or more predefined functions calls 602a-602h. For example, a LDAPc.Subscribe(char* application, char* query, char* buffer) function call 602a may be provided to, for example, register one of the applications 202-208 with the LDAP client 210, enable the LDAP client 210 to receive an update event when one of the applications 202-208 requests an update (e.g., if a user of the device 210 flagged one of the application 202-208 to be automatically updated, etc.), etc. To flag one of the applications 202-208 for automatic update, the user of the device 110 may access a customization screen provided by the OS 212 for flagging the applications 202-208 for automatic update. The function call 602a may establish a context for the applications 202-208 to make a query at a request of the user of the device 110.

Registering may include updating a record in the database 210a of the LDAP client 210 for one of the applications 202-208 making the LDAPc.Subscribe(char* application, char* query, char* buffer) function call 602a. The updated record may inform the LDAP client 210, that upon a next connection to the back end server 106, to update the application making the function call, maybe without updating the other of the applications 202-208, but while making the LDAP client 210 aware of the existence of the other of the applications 202-208.

The LDAPc.Subscribe(char* application, char* query, char* buffer) function call 602a may be called by the applications 202-208, for example, only once, for example, when the applications 202-208 are invoked for the first time. The function call 602a may store information (e.g., the update flag, etc.) for the application making the function call in the database 210a of LDAP client 210. The char* application parameter may be a string that may identify the application making the function call and may be determined by a programmer of such application. The char* query parameter may be the query string that may be passed to the back end server 106 by the LDAP client 210. The char* buffer parameter may a location in the database 210a of the LDAP client 210 where the information received from the application making the function call may be stored. A buffer may be a portion of memory provided in the hardware 214 for the database 210a, and which may provide persistence.

The LDAPc.QueryNow( ) function call 602b, for example, may inform the LDAP client 210 to issue a query for a current application (i.e., the application making the function call) and for every one of the applications 202-208 flagged for automatic update. The current application of the applications 202-208 may or may not be flagged for automatic update. The LDAPc.QueryNow( ) function call 602b may be called when, for example, the user of the device 110 taps on a refresh or update button provided on the GUI of the applications 202-208. The function call 602b may place an update signal or flag in an event queue of the OS 212.

The LDAPc.GetNextRow( ) function call 602c, for example, may obtain a next row of information from a LDAP query. The LDAPc.GetNextRow( ) function call 602c may be called after the LDAPc.QueryNow( ) function call 602b succeeds in storing the application information for the applications 202-208 in the database 210a of the LDAP client 210. Via the function call 602c, the application making the function call 602c may present the data or process the data received via the function call 602c from the database 210a one row at the time. The function call 602c may be issued inside a loop to traverse the entire database of the application making the function call.

The LDAPc.Done( ) function call 602d, for example, may release resources. The LDAPc.Done( ) function call 602d may close all of the databases for the applications 202-208, may close the LDAP and TCP/IP connection, may hang up any connection to the back end server 106, etc.

The LDAPc.UpdateSignal( ) function call 602e, for example, may determine if any of the applications 202-208 may have requested an update, and if a current application of the applications 202-208 may be earmarked for automatic update by the user of the device 110. Thus, the LDAPc.UpdateSignal( ) function call 602e, for example, may determine if there may be a pending LDAP client 210 update event. The LDAPc.UpdateSignal( ) function call 602e may be helpful in determining whether or not a current event or interrupt may be due to a LDAP client 210 update event.

Thus, the LDAPc.UpdateSignal( ) function call 602e may be employed by the LDAP client 210 to handle events. The OS 212 of the device 110 may be event driven, wherein the OS 212 may receive events from the applications 202-208 and/or from the hardware 214. These events may be placed in a FIFO queue of memory of the hardware 214 and may be processed in an order received. The LDAPc.UpdateSignal( ) function call 602e may be employed by the LDAP client 210, for example, to: (i) determine if there may be an update signal in the event queue; and (ii) if there may be no update signal pending in the event queue, to issue one.

The LDAPc.SetPref(ldapcpref* pldappref) function call 602f, for example, may store preferences for the applications 202-208 in the database 210a of the LDAP client 210. The LDAPc.SetPref(ldapcpref* pldappref) function call 602f may be used by the applications 202-208 to provide a means by which the user of the device 110 may set the preferences for the application making the function call and that may modify the behavior of the application making the function call. The preferences may be updated, for example, via a menu option, a set of mean options, input fields, etc., provided on the GUI of the application making the function call.

For example, a preference setting that may be common to all of the applications 202-208 may be the update flag, which informs the LDAP client 210 whether or not the databases corresponding to flagged applications may be updated. Once the preferences for the application 202-208 may be determined by the user of the device 110, the application may call the function call 602f to save or update the preferences for the application making the function call in the database 210a of LDAP client 210.

The ldapcpref* pldappref parameter may be a pointer to a preferences date structure. The preferences data structure may include, for example, the following members; (i) char applicationName[50], an array containing the name of the application making the function call, for example, of length of 50; (ii) int Update, the update flag; (iii) int Mode, indicating whether or not the database of the application making the function call may be cleared and re-updated or whether or not new records may be appended; and (iv) char specificFlags [50], flags that may be specific to each of the applications 202-208, and that may be determined by the programmer of the applications 202-208.

The LDAPc.GetPref(ldapcpref* pldappref) function call 602g, for example, may return the specific preferences stored in the database 210a of the LDAP client 210 for the application making the function call. The LDAPc.GetPref (ldapcpref* pldappref) function call 602g may be called after the LDAPc.SetPref(ldapcpref* pldappref) function call 602f succeeds in storing the application preference information for the applications 202-208 in the database 210a of the LDAP client 210.

The LDAPc.LastUpdate(timeNdate* pTimeNDate) function call 602h, for example, may return a time and date since the current application of the applications 202-208 may have been updated by the LDAP client 210. The LDAPc.LastUpdate(timeNdate*pTimeNDate) function call 602h may be called by the LDAP client 210 to determine dates and times of updates of the applications 202-208 via timeNdate* pTimeNDate parameter.

In a preferred embodiment of the present invention, one of the noted preferences may be a timer for scheduled updates, so that when the timer expires the LDAP client 210 either detects a connection (e.g., dialup, etc.) and automatically updates and/or issues an alarm notification indicating that it may be time to update information for an application of the applications 202-208, as such information may be old.

The LDAP client-based device 110 according to the present invention, in terms of functional capabilities, may be between that of a pager and a personal computer (PC), such as a laptop PC. The LDAP client-based device 110 according to the present invention may be closer to a PC, in that it has an operating system, it may run applications (i.e., programs). Such program may be written by any programmer who knows a suitable programming language (e.g., C, C++, Java, J2ME, etc.). The variety of applications that may be run on the LDAP client-based device 110 according to the present invention may be comparable to those found for a PC. The user may input data, have the program process the data and then retrieve the data, as may be the case with a spreadsheet application.

The LDAP client-based device 110 according to the present invention may not be as powerful or feature-rich as a typical PC, in that the display area may not be as large and the device 110 may have limited memory and processor resources. The input to the LDAP client-based device 110 may by comparison somewhat cumbersome, since no mouse or keyboard may be typically provided. The graphics typically may not be as good as on a PC. However, the LDAP client-based device 110 may fit in a pocket of a user, may transfer data to and from a PC, and the number of applications may grow exponentially.

The present invention may be useful to, for example, all owners of hand-held devices, such as Palm Pilots, Handspring devices, cell phones, etc., and perhaps even useful for laptop computer owners. Some of the services a user may subscribe to, for example, may include: (i) Stock quotes: the symbol and the current value are displayed—however, many aspects of such a service may be customized, such as: the symbol list, symbol lookup, information refresh rate, etc.; (ii) Portfolio quote: a summary report for the user's stock portfolio as provided by the user's stockbroker; (iii) E-mail: instead of puffing all of the information across, just pull down the headers (i.e., subjects), if a message is selected to be read then the message body may be retrieved; (iv) Phone number lookup: nation wide, directory lookup without advertisements; (v) E-mail address lookup; (vi) Search engines; (vii) Web-based meeting scheduler. The device 110 may include a calendar and a To-Do list. For instance, the user may access a Web page, set a time for a meeting, then when the device 110 dials up, the meeting may be added to the user's calendar. A similar scenario applies for the To-Do items. Another types of services may be (viii) Other publish and subscribe services.

Similarly, stock quote providing services, stockbrokers, etc., may benefit from the present invention. In this scenario, such entities may pay the LDAP service provider (e.g., the owner of the back end server 106 of FIG. 1) for providing the noted services to their customers on their behalf. Similarly, e-mail providers may benefit from the present invention by paying, for example, the LDAP service provider to allow their clients to download their e-mail and software on to the devices 110 via the LDAP service provider's infrastructure.

In the same way, banks may provide account information to their customers via the LDAP service provider's infrastructure. Similarly, credit card companies may provide account information to their customers via the LDAP service provider's infrastructure.

Search engines may pay the LDAP service provider to provide customers with access to their databases via the LDAP service provider's infrastructure. Otherwise, such service could be given to customers of an Internet service provider (ISP) as a value-added feature.

Directory look up providers local phone service providers, Internet phone book service providers would benefit from the present invention. In this same way, map providers may pay the LDAP service provider to allow their customers to download a map (e.g., text, graphics, etc.) via wireless modem for display on the device 110.

All of the above-noted services would allow the user to customize certain basic parameters, for example, including: (i) amount of information, coming back at one time, (ii) presentation mode, (iii) information refresh rate, (iv) butler size, (v) the integration of various applications (e.g., so that with one call all applications are updated). The suite of applications may be extended as time goes on.

In the above respect, the hand-held service market may be practically untapped. No such services exist currently. The hand-held applications market may be one of the fastest growing out there and there are literally millions of hand-held device users in this market. Owners of hand-held devices are always looking for new applications or services to run on their hand-held devices. Internet companies are noticing and thinking of services to provide customers with hand-held devices. According to the present invention, initial and subsequent services may be targeted for either the owners of hand-held devices directly or for companies that want to provide their customers with information or access to their information via a hand-held device.

The present invention stores information relating to various processes described herein. This information may be stored in one or more memories, such as a hard disk, optical disk, magneto-optical disk, RAM, etc. One or more databases, such as the databases 102*a*, 106*a*, 202*a*, 210*a*, etc., may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 7, for example.

The previously described processes include appropriate data structures for storing data collected and/or generated by the processes of the system 100 of FIG. 1 in one or more databases thereof. Such data structures accordingly will include fields for storing such collected and/or generated data. In a database management system, data may be stored in one or more data containers, each container contains records, and the data within each record may be organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology. Systems that implement the present invention are not limited to any particular type of data container or database architecture. However, for the purpose of explanation, the terminology and examples used herein shall be that typically associated with relational databases. Thus, the terms table, row, and column may be used herein to refer respectively to the data container, record, and field.

All or a portion of the invention (e.g., as described with respect to FIGS. 1-6) may be conveniently implemented using one or more conventional general purpose computers, microprocessors, digital signal processors, micro-controllers, etc., programmed according to the teachings of the present invention (e.g., using the computer system of FIG. 7), as will be appreciated by those skilled in the computer art. Appropriate software may be readily prepared by programmers of ordinary skill based on the teachings of the present disclosure, as will be appreciated by those skilled in the software art. In addition, the present invention (e.g., as described with respect to FIGS. 1-6) may be implemented by the preparation of application-specific integrated circuits or by interconnecting an appropriate network of conventional component circuits, as will be appreciated by those skilled in the electrical art(s). Further, the present invention may be implemented on the World Wide Web (e.g., using the computer system of FIG. 7).

Figure 7:
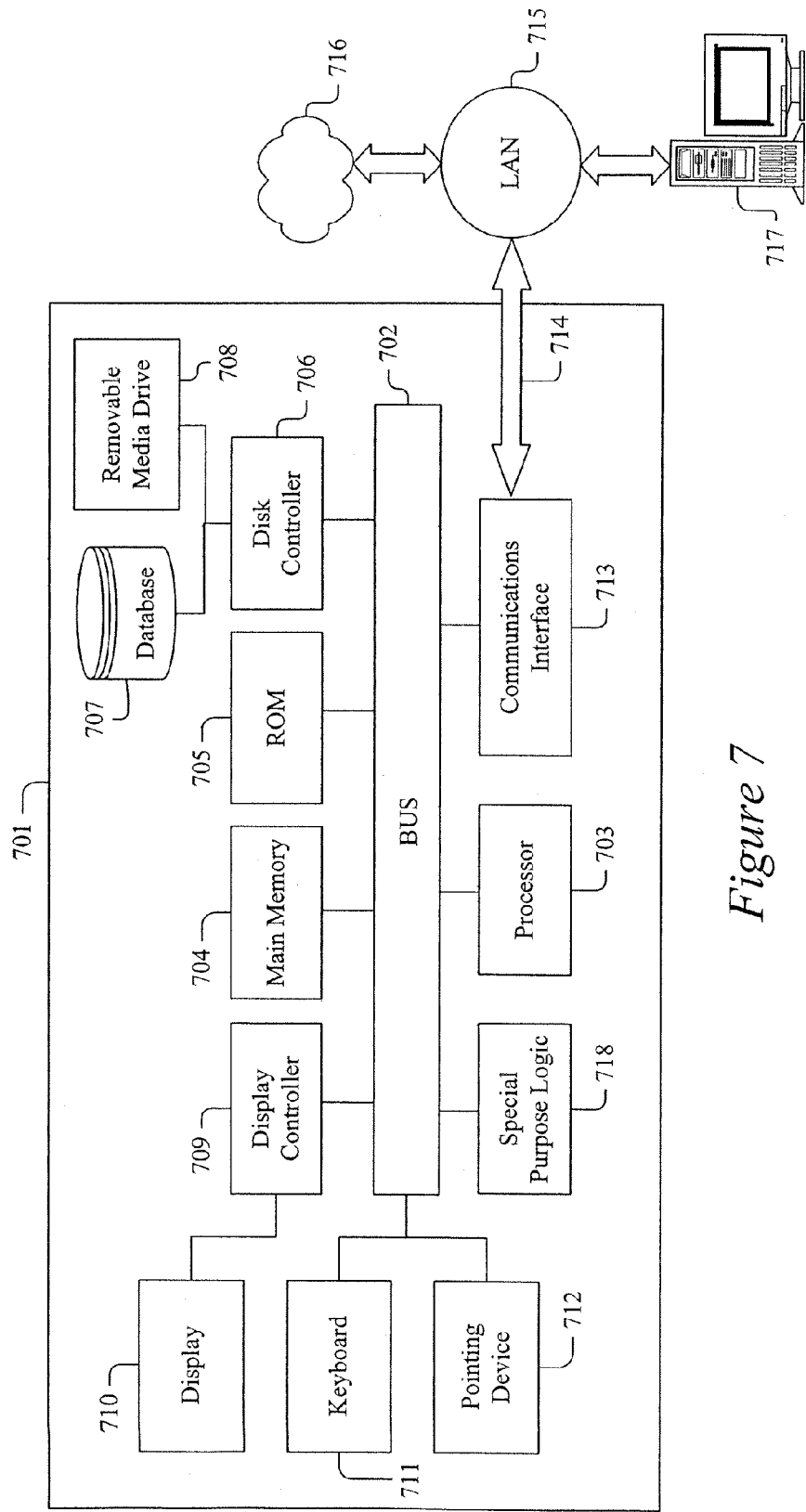
FIG. 7 is an exemplary computer system, which may be programmed to perform one or more of the processes of the present invention.

FIG. 7 illustrates a computer system 701 upon which the present invention (e.g., systems 102, 106, 110, etc.) may be implemented. The present invention may be implemented on a single such computer system, or a collection of multiple such computer systems. The computer system 701 includes a bus 702 or other communication mechanism for communicating information, and a processor 703 coupled to the bus 702 for processing the information. The computer system 701 also includes a main memory 704, such as a random access memory (RAM), other dynamic storage device (e.g., dynamic RAM (DRAM), static RAM (SRAM), synchronous DRAM (SDRAM)), etc., coupled to the bus 702 for storing information and instructions to be executed by the processor 703. In addition, the main memory 704 may also be used for storing temporary variables or other intermediate information during the execution of instructions by the processor 703. The computer system 701 further includes a read only memory (ROM) 705 or other static storage device (e.g., programmable ROM (PROM), erasable PROM (EPROM), electrically erasable PROM (EEPROM), etc.) coupled to the bus 702 for storing static information and instructions.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices 718, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, etc.

The computer system 701 may also include a display controller 709 coupled to the bus 702 to control a display 710, such as a cathode ray tube (CRT), liquid crystal display (LCD), active matrix display, plasma display, touch display, etc., for displaying or conveying information to a computer user. The computer system includes input devices, such as a keyboard 711 including alphanumeric and other keys and a pointing device 712, for interacting with a computer user and providing information to the processor 703. The pointing device 712, for example, may be a mouse, a trackball, a pointing stick, etc., or voice recognition processor, etc., for communicating direction information and command selections to the processor 703 and for controlling cursor movement on the display 710. In addition, a printer may provide printed listings of the data structures/information of the system shown in FIGS. 1-6, or any other data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. Execution of the arrangement of instructions contained in the main memory 704 causes the processor 703 to perform the process steps described herein. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

Stored on any one or on a combination of computer readable media, the present, invention includes software for controlling the computer system 701, for driving a device or devices for implementing the invention, and for enabling the computer system 701 to interact with a human user (e.g., a user of the systems 102, 106, 110, etc.). Such software may include, but may not be limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java, J2ME, etc.) classes and applets, complete executable programs, Common Object Request Broker Architecture (CORBA) objects, etc. Moreover, parts of the processing of the present invention may be distributed for better performance, reliability, and/or cost.

The computer system 701 also includes a communication interface 713 coupled to the bus 702. The communication interface 713 provides a two-way data communication coupling to a network link 714 that may be connected to, for example, a local area network (LAN) 715, or to another communications network 716 such as the Internet. For example, the communication interface 713 may be a digital subscriber line (DSL) card or modem, air integrated services digital network (ISDN) card, a cable modem, a telephone modem, etc., to provide a data communication connection to a corresponding type of telephone line. As another example, communication interface 713 may be a local area network (LAN) card (e.g., for Ethernet™, an Asynchronous Transfer Model (ATM) network, etc.), etc., to provide a data communication connection to a compatible LAN. Wireless links may also be implemented. In any such implementation, communication interface 713 sends and receives electrical, electromagnetic, or optical signals that carry digital data streams representing various types of information. Further, the communication interface 713 may include peripheral interface devices, such as a Universal Serial Bus (USB) interface, a PCMCIA (Personal Computer Memory Card International Association) interface, etc.

The network link 714 typically provides data communication through one or more networks to other data devices. For example, the network link 714 may provide a connection through local area network (LAN) 715 to a host computer 717, which has connectivity to a network 716 (e.g. a wide area network (WAN) or the global packet data communication network now commonly referred to as the Internet) or to data equipment operated by service provider. The local network 715 and network 716 both use electrical, electromagnetic, or optical signals to convey information and instructions. The signals through the various networks and the signals on network link 714 and through communication interface 713, which communicate digital data with computer system 701, are exemplary forms of carrier waves bearing the information and instructions.

The computer system 701 may send messages and receive data, including program code, through the network(s), network link 714, and communication interface 713. In the Internet example, a server (not shown) might transmit requested code belonging to an application program for implementing an embodiment of the present invention through the network 716, LAN 715 and communication interface 713. The processor 703 may execute the transmitted code while being received and/or store the code in storage devices 707 or 708, or other non-volatile storage for later execution. In this manner, computer system 701 may obtain application code in the form of a carrier wave. With the system of FIG. 7, the present invention may be implemented on the Internet as a Web Server 701 performing one or more of the processes according to the present invention for one or more computers coupled to the Web server 701 through the network 716 coupled to the network link 714.

The term computer readable medium as used herein may refer to any medium that participates in providing instructions to the processor 703 for execution. Such a medium may take many forms, including but not limited to, non-volatile media, volatile media, transmission media, etc. Non-volatile media include, for example, optical or magnetic disks, magneto-optical disks, etc., such as the hard disk 707 or the removable media drive 708. Volatile media include dynamic memory, etc., such as the main memory 704. Transmission media include coaxial cables, copper wire, fiber optics, including the wires that make up the bus 702. Transmission media may also take the form of acoustic, optical, or electromagnetic waves, such as those generated during radio frequency (RF) and infrared (IR) data communications. As stated above, the computer system 701 includes at least one computer readable medium or memory for holding instructions programmed according to the teachings of the invention and for containing data structures, tables, records, or other data described herein.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer may read.

Various forms of computer-readable media may be involved in providing instructions to a processor for execution. For example, the instructions for carrying out at least part of the present invention may initially be borne on a magnetic disk of a remote computer connected to either of networks 715 and 716. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a PDA, a laptop, an Internet appliance, a cellular phone, a palmtop computer, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Although the present invention may be defined in terms of the applications 202-208 utilizing the API 602 as describe herein, the present invention may be practiced with any API designed to interact with the LDAP client 210, as will be appreciated by those skilled in the software art.

Although the present invention may be described in terms of applications in hand-held devices, such as PDAs, palmtop computers, cell phones, Internet appliances, etc., the present invention is applicable to other devices, such laptop computers, etc., where memory and processing resources are at a premium, as will be appreciated by those skilled in the relevant art(s).

While the present invention has been described in connection with a number of embodiments and implementations, the present invention is not so limited bat rather covers various modifications and equivalent arrangements, which fall within the preview of the appended claims.

What is claimed is:

1. A method comprising:
    interfacing, via an application program interface (API) resident on a device, a lightweight directory access protocol (LDAP) client and one or more applications that are resident on the device; and
    initiating termination, via the API, of a connection with a backend server and a local database associated with the LDAP client.

2. A method of claim 1, further comprising:
    invoking, on the device, the LDAP client configured to perform a plurality of function calls via the API, wherein the function calls perform tasks on behalf of the applications or the LDAP client.

3. A method of claim 1, wherein the device includes or is included in a cellular phone.

4. A method of claim 1, further comprising:
    generating a single query to the directory server on behalf of one of the applications, the single query identifying data used by the one application; and
    receiving the data in a single transmission in response to the single query.

5. A method of claim 1, further comprising:
    determining whether the one or more applications are configured to have data automatically retrieved by the LDAP client upon the LDAP client connecting to the backend server.

6. A method of claim 1, further comprising:
    storing, in the local client database, preference information for one of the applications.

7. A method of claim 1, wherein the backend server includes a directory server.

8. An apparatus comprising:
    at least one processor; and
    at least one memory including computer program code for one or more programs,
    the at least one memory and the computer program code configured to, with the at least one processor, cause the apparatus to perform at least the following,
        interface, via an application program interface (API) resident on a device, a lightweight directory access protocol (LDAP) client and one or more applications that are resident on the device, and
        initiate termination, via the API, of a connection with a backend server and a local database associated with the LDAP client.

9. An apparatus of claim 8, wherein the apparatus is further caused to:
    invoke, on the device, the LDAP client configured to perform a plurality of function calls via the API, wherein the function calls perform tasks on behalf of the applications or the LDAP client.

10. An apparatus of claim 8, wherein the apparatus is included in the device, the device including a cellular phone.

11. An apparatus of claim 8, wherein the apparatus is further caused to:
    generate a single query to the directory server on behalf of one of the applications, the single query identifying data used by the one application; and
    receive the data in a single transmission in response to the single query.

12. An apparatus of claim 8, wherein the apparatus is further caused to:
    determine whether the one or more applications are configured to have data automatically retrieved by the LDAP client upon the LDAP client connecting to the backend server.

13. An apparatus of claim 8, wherein the apparatus is further caused to:
    store, in the local client database, preference information for one of the applications.

14. An apparatus of claim 8, wherein the backend server includes a directory server.

15. A method comprising:
    invoking a lightweight directory access protocol (LDAP) client that is resident on a device and configured to interface, via an application program interface (API), one or more applications,
    wherein the API is configured to facilitate the LDAP client in performing a plurality of function calls on behalf of the one or more applications.

16. A method of claim 15, further comprising:
    initiating termination, via the API, of a connection with a backend server and a local database associated with the LDAP client.

17. A method of claim 15, wherein the device includes or is included in a cellular phone, and the backend server includes a directory server.

18. A method of claim 15, further comprising:
generating a single query to the directory server on behalf of one of the applications, the single query identifying data used by the one application; and
receiving the data in a single transmission in response to the single query.

19. A method of claim 15, further comprising:
determining whether the one or more applications are configured to have data pulled by the LDAP client upon the LDAP client connecting to the backend server.

20. A method of claim 15, further comprising:
storing, in the local client database, preference information for one of the applications.

* * * * *

UNITED STATES PATENT AND TRADEMARK OFFICE
CERTIFICATE OF CORRECTION

PATENT NO. : 8,307,378 B2
APPLICATION NO. : 13/205336
DATED : November 6, 2012
INVENTOR(S) : Espino It is certified that error appears in the above-identified patent and that said Letters Patent is hereby corrected as shown below:

In the Drawings:

In Fig. 6b, Sheet 6 of 8, delete

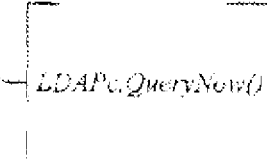

"

and insert

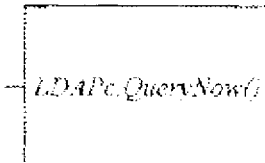

-- therefor.

In the Specification:

In Column 3, Line 41, delete "anew" and insert -- a new --, therefor.

In Column 10, Line 55, delete "database 210" and insert -- database 210a --, therefor.

In Column 18, Line 7, delete "Model" and insert -- Mode --, therefor.

Signed and Sealed this
Fourth Day of June, 2013

Teresa Stanek Rea
*Acting Director of the United States Patent and Trademark Office*